United States Patent [19]
Hochman et al.

[11] Patent Number: 5,206,743
[45] Date of Patent: Apr. 27, 1993

[54] FACSIMILE ROUTING METHODOLOGY

[75] Inventors: Gary Hochman, Glen Head; Paul Lichter, Kew Gardens, both of N.Y.

[73] Assignee: All the Fax Business Systems, Inc., New York, N.Y.

[21] Appl. No.: 636,077

[22] Filed: Dec. 28, 1990

[51] Int. Cl.$^5$ ............................................. H04N 1/00
[52] U.S. Cl. ..................... 358/440; 358/438; 358/407
[58] Field of Search ............... 358/440, 438, 407, 402, 358/404

[56] References Cited

U.S. PATENT DOCUMENTS

| | | | |
|---|---|---|---|
| 4,754,335 | 6/1988 | Izawa et al. | 358/440 |
| 4,811,111 | 3/1989 | Kurokawa | 358/440 |
| 4,893,333 | 1/1990 | Baron et al. | 379/100 |
| 4,941,170 | 7/1990 | Herbst | 358/440 |
| 4,965,676 | 10/1990 | Ejiri et al. | 358/404 |
| 4,994,926 | 2/1991 | Gordon et al. | 358/440 |
| 5,021,889 | 6/1991 | Yamamoto | 374/100 |
| 5,030,948 | 7/1991 | Rush | 340/825.44 |
| 5,115,326 | 5/1992 | Burgess et al. | 358/440 |

FOREIGN PATENT DOCUMENTS

| | | | |
|---|---|---|---|
| 0179062 | 10/1983 | Japan | 358/440 |
| 0248061 | 12/1985 | Japan | 358/440 |
| 0226249 | 8/1989 | Japan | 358/440 |

*Primary Examiner*—Edward L. Coles, Sr.
*Assistant Examiner*—Thomas L. Stoll
*Attorney, Agent, or Firm*—Schweitzer Cornman & Gross

[57] ABSTRACT

A methodology for allowing the transmission of a facsimile message to a specified location on a multi-user computer network consists of modifying a portion of the handshake data fields transmitted in conjunction with the facsimile images. The data field is modified to accept sender-entered data, typically a recipient-specific identification code. The receiving facility obtains the data as part of the handshake procedure, and utilizes the identification code to effect routing of the message to the intended recipient. The data field utilized is preferably the Transmit Terminal Identifier field of the handshake transmission.

10 Claims, 3 Drawing Sheets

FACSIMILE ROUTING METHODOLOGY

The present invention relates to a procedure which allows the inclusion of sender-chosen data in a computer-compatible format in conjunction with a facsimile transmission. The invention has particular applicability to the routing or processing of facsimile documents to a designated recipient in a multi-user computer network.

BACKGROUND OF THE INVENTION

The use of facsimile transmission and reception equipment has become widespread. Facsimile machines are often stand-alone units, allowing the transmission and reception of facsimile-encoded data, representing the contents of documents, over public telephone systems to a compatible unit connected to the telephone system at the telephone number to which the transmission is directed.

To further enhance the usefulness of facsimile equipment, systems and devices exist which allow the transmission and reception of facsimile data through a computer system. In the receipt mode, the computer is programmed to identify an incoming signal as having facsimile data, provide the necessary "handshake" with the transmitting unit to allow facsimile communication to be established, and receive the transmitted data in a page image form, either storing or printing out the images as required. Similarly, a computer facility configured to duplicate the functions of a facsimile machine in the transmission mode institutes a call to a receiving unit, establishes communication with the unit through the handshake, and transmits a data stream corresponding to page images in the recognized facsimile format for reception by the receiver.

Many organizations utilize shared computer resources in a network environment. In such a case, an incoming facsimile message received by the principal or network server computer normally cannot be automatically routed to the recipient. Rather, the message is received at the primary location and is manually redirected to the intended recipient. Because a facsimile message is received as a graphics image, duplicating the "look" of the source document, the information appearing therein cannot normally be read and interpreted by a computer, and thus cannot be utilized to determine the recipient such that automated redirection can be accomplished. While various mechanisms have been developed for the interpretation of written data, including optical character recognition techniques and other interpreting algorithms, such systems either require significant additional equipment or significant computing power. In addition, such systems normally do not have the flexibility necessary to accommodate the wide variety of writings, both machine and hand-generated, to insure accurate interpretation of the data and redirection as may be required.

It is accordingly a purpose of the present invention to provide a methodology which allows a facsimile message to be automatically routed to an intended recipient on a multi-user network.

Yet another purpose of the present invention is to provide a methodology where user identification numbers may be incorporated in a facsimile transmission compatible with currently existing standards.

Still another purpose of the present invention is to provide a methodology whereby a user identification number transmitted in conjunction with a facsimile communication may be located and utilized by automated data processing equipment to route or otherwise process the transmission in a desired manner.

An additional purpose of the present invention is to provide a methodology which allows an identification code to be applied to a facsimile transmission in a manner which does not affect or utilize the data image portion of the transmission, and allows the code to be extracted from the transmission without degrading or otherwise affecting the other transmitted data.

A further purpose of the present invention is to provide such a methodology which maintains compatibility between facsimile transmission and reception equipment according to CCITT standards.

BRIEF DESCRIPTION OF THE INVENTION

In accordance with the above and other objects, the present invention utilizes a data string which is transmitted as part of the handshake routines utilized by facsimile transmission and reception equipment to engage each other preparatory to the passage of facsimile images therebetween. The invention allows the inclusion of a user-specified, multiple character string, preferably as part of the portion of the sender's TSI data field normally reserved for the telephone number of the sending facility. This data is received by the recipient facility prior to the transmission of image data, and is not processed in a manner which affects the facsimile transmission.

The receiving facility, typically a microprocessor system with facsimile reception capabilities, examines the TSI data to determine whether an identification code has been transmitted and, if it appears, provides the necessary subroutines to forward the subsequently received facsimile signal to the location identified. Because the identification number is transmitted as part of the handshake protocols, it does not affect the facsimile image data transmitted and, if not present, does not prevent the reception of the facsimile data in the normal manner.

BRIEF DESCRIPTION OF THE DRAWINGS

A fuller understanding of the present invention will be realized upon consideration of the following detailed description of a preferred, but nonetheless illustrative embodiment thereof, when reviewed in conjunction with the annexed drawings, wherein.

DETAILED DESCRIPTION OF A PREFERRED EMBODIMENT

In order for a pair of facsimile units to communicate with each other, linkage must be established between the units to allow the data to be transmitted and received in a compatible manner. This linkage is performed by the use of "handshake" signals, which consists of the initial exchange of data between the units preparatory to the actual transmission of the facsimile image data. The handshake signals conform to CCITT protocols to allow machines of various manufacturers to be compatible with each other.

A part of the handshake procedure typically consists of the transfer of information provided by the users, typically programmed into and stored by the facsimile unit. The information normally provided by the user includes the telephone number of the facsimile machine, as well as an identifier for the facility at which the machine is located, such as a company name or the like. This part of the handshake data is known as TSI (Transmit Station Identifier) or CSID data. This date may or may not appear on the hard copy facsimile image produced at the receiving end, and is transmitted in a form compatible with data processing, as compared to the image data of the facsimile message itself.

Figure 1:
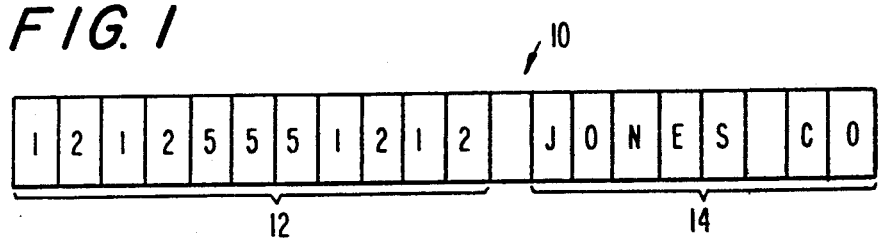
FIG. 1 is a representation of a typical TSI data field.

The present invention utilizes characters placed within the TSI data field or other portions of the data fields utilized during handshake and includes a routine at the recipient's location to recognize such data and interpret it in a manner which allows redirection of the accompanying faxed message. The field chosen, and the modification thereto, is such that it is "non destructive", that is, it does not materially affect the transmission receipt of the facsimile document. In particular, and as depicted in FIG. 1, the TSI field 10 may be in the form of a 20-character long data field, typically including the sender's telephone number 12 and the sender's identification 14. This information is normally loaded by the user at the time the facsimile unit is configured for operation.

Figure 2:
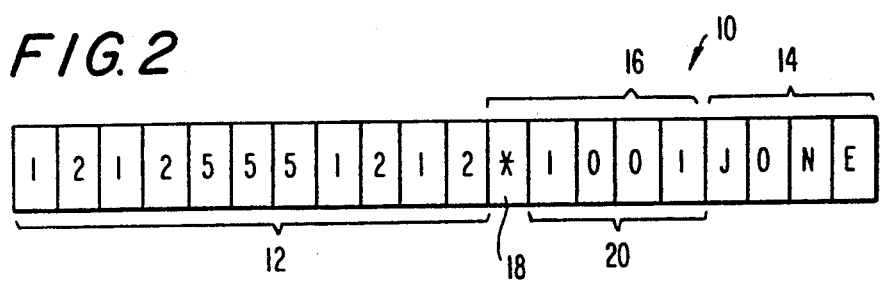
FIG. 2 is a representation of a TSI data field altered in accordance with the present invention.

As shown in FIG. 2, this field is modified to include a new sub-field 16, which carries a character string used to identify the intended recipient at a multi-terminal location. In the embodiment depicted in the figures, five characters are accommodated. This additional field 16 is commenced with a unique control character 18, such as the * (asterisk) or # (pound) sign, which allows the receiving circuitry to recognize the end of the telephone number 12 and the start of the appended data. The control character is required to accommodate preceding telephone numbers which may be of various lengths due to area codes, international dialing codes, and the like. The asterisk and pound sign are particularly preferred as they may be programmed through a standard DTMF or touch-tone telephone keypad, while the following four character code designation is preferably of digits which also allows entry through a telephone keypad.

The data field 20 following the control character represents the identification of a specific recipient location to which the facsimile image is directed. In a preferred embodiment of the invention, utilized in conjunction with a computer system adapted as known in the art for facsimile transmission and reception, the identification number may be stored by the sender in and recalled from memory, to be inserted as required in conjunction with a transmission. Alternatively, the number may be manually entered for use at the time the facsimile transmission is made, in conjunction with loading of the phone number to which the transmission is directed.

Figure 3:
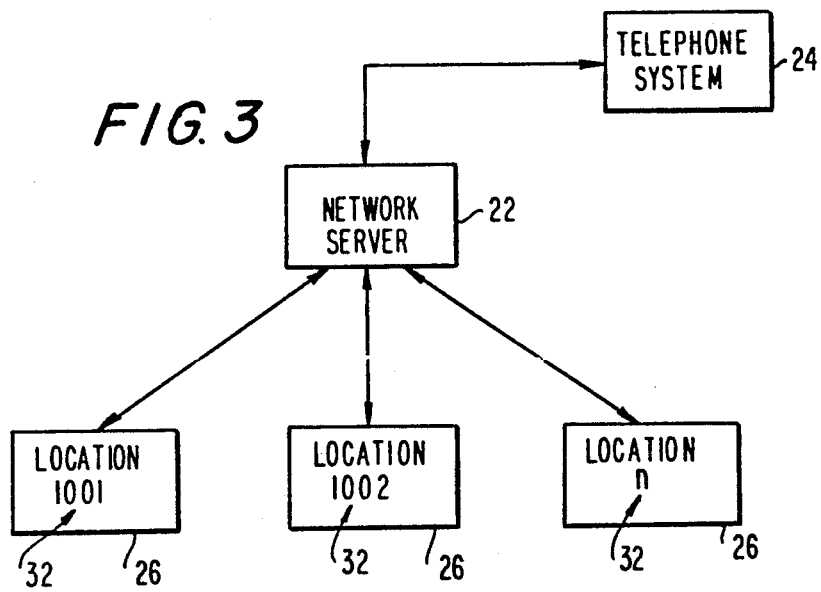
FIG. 3 is a representation of a computer network interconnected to a public telephone system for facsimile transmission.

An illustrative computer system in which the invention may be utilized is shown in FIG. 3. As depicted therein, network server computer 22 is coupled to the public telephone system 24 and is provided with a facsimile board as known in the art to allow delivery (as well as transmission) of facsimile-compatible data. The server is coupled to a plurality of remote terminals 26 through a network 30 which allows the passage of data between the terminals and server. Each terminal 26 is assigned a unique identification number 32 which corresponds to an available value for the data field 20. Upon receipt of a facsimile transmission, including the identification number 32, the server 22 can direct the message to the appropriate location 26.

Figure 4:
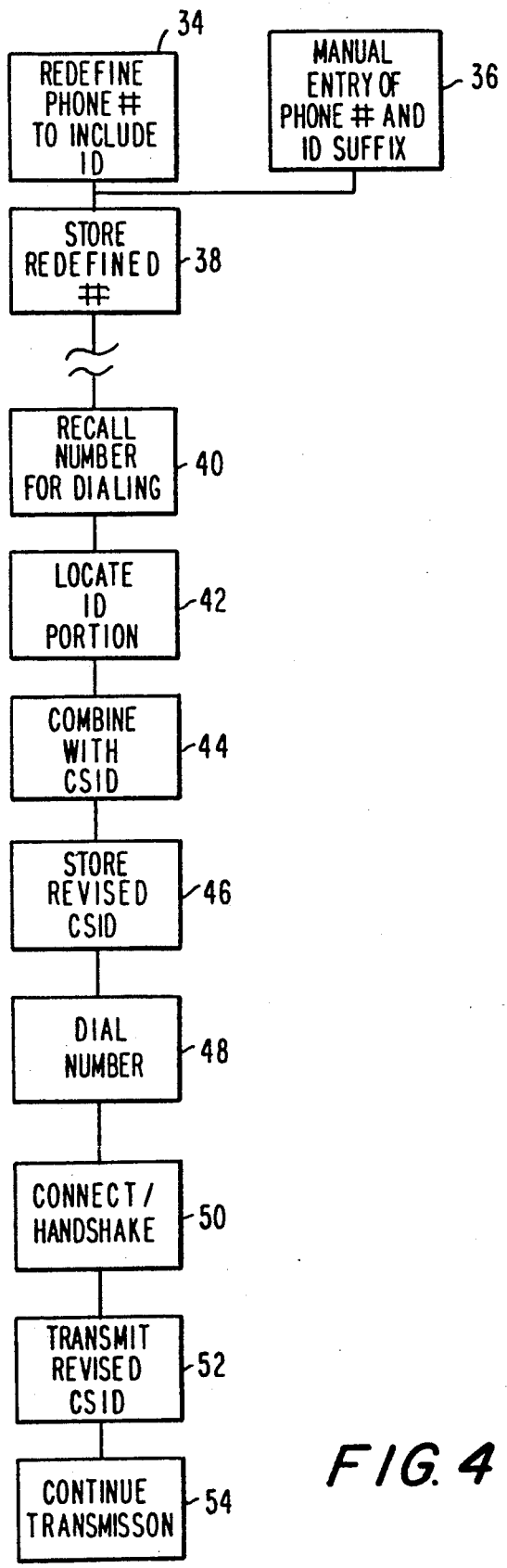
FIG. 4 is a flow diagram of the transmission phase of the present invention.

As shown in FIG. 4, the procedure may be commenced in a computer environment by insertion of an identification number 32 into the sender's unit's memory at 34 as a 5 digit suffix to the telephone number of the intended recipient, typically stored in a telephone number database for the facsimile system dialer. Alternatively, the number may be manually entered at 36 during the dialing process. In either case, the transmitting system accepts and stores the entered data at 38.

When a facsimile transmission is desired, the stored combination phone number and identification number is recalled at 40. The identification number portion is located at 42 and combined with the sender's "normal" TSI of FIG. 1 at 44 to create the revised TSI of FIG. 2. The identification number may be placed after the telephone number portion, in which case the control character 18 remains at the head of the field, or may precede the telephone number, in which case the control character is moved to the rear of the field. In either case, it serves to separate the identification number from the TSI telephone number. The receiving equipment is programmed in accordance with the claim positioning.

The revised TSI is stored at 46. The transmitting unit dials at 48, and connection with the receiving facility commencing at 50. the transmitting unit awaits a request for its TSI and transmits the revised TSI at 52. Depending on the length of the original TSI and the specific processing employed, a portion of the original TSI may not be transmitted or not received. As the CSID data is not utilized by the recipient as part of its processing of the facsimile data, however, the inclusion of the recipient ID number, as well as the dropping off of a portion of the original data field, does not constitute a material alteration of system operation and does not affect the subsequent processing of the facsimile data. In the event redirection is not utilized, the only modification to conventional transmission would be a perhaps somewhat unrecognizable entry on a reception journal of the recipient device. After transmission of the TSI, communication and transmission of the facsimile data continues in the normal manner at 54.

Figure 5:
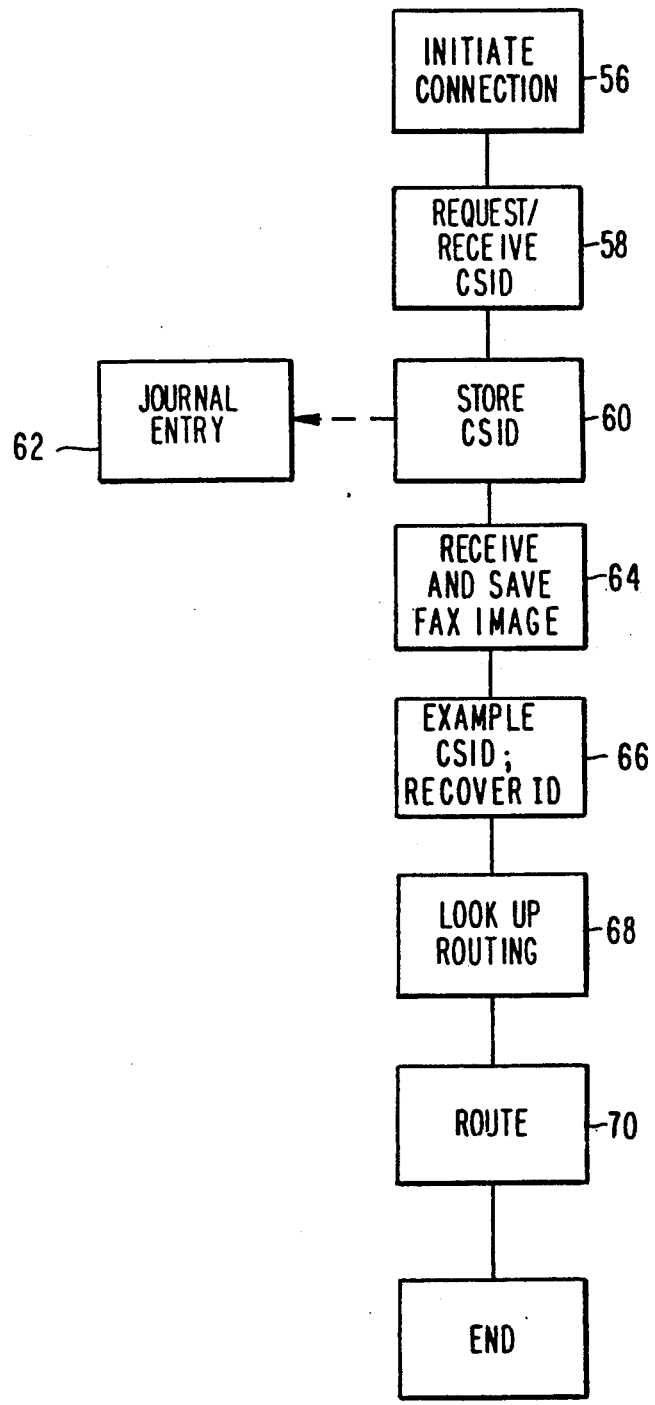
FIG. 5 is a flow diagram of the reception phase of the present invention.

As shown in FIG. 5, reception of a facsimile transmission including recipient identification data by a network facility commences in the normal fashion, with the connection between the equipment being established at 56. The receiving facility receives the transmitter's CSID at 58, which is stored at 60 in addition to being utilized as may be required to print or store a journal entry at 62. The facsimile handshake continues, with the fax image being received and stored by the receiving facility in the conventional manner at 64.

At the end of the transmission, the stored TSI is examined at 66 to separate the identification number from the remaining portions of the transmitted field. A lookup function is performed at 68, between the received identification number and an identification number-location database to associate the identification number with a recipient location. The facsimile image is then routed at 70 to that location. The recipient can then view, print or store the image as desired.

Annexed hereto as is a listing of the programming necessary to modify the software of a GammaFax fax board manufactured by GammaLink Graphics Communications of Palo Alto, Calif., to accomplish the foregoing transmission and reception functions in in connection with IBM personal computers and compatibles running a network environment. Such a product is intended to be utilized under PC or MS DOS version 3.0 or higher.

It is to be appreciated that the use of the TSI is not limited solely for routing purposes. For example, certain identification numbers can be utilized to indicate the confidential status of a transmission, such that it is to be stored in a manner accessible by only those having a proper password. Similarly, while the present invention has been described as modifying the TSI to allow such processing, it is to be recognized that other portions of the data fields transmitted between facilities as part of the handshake process can be modified in a similar manner to accept user-defined fields to direct or otherwise control the usage or processing of the facsimile images transmitted therebetween.

```
REM NETFAX
REM THIS IS A LOCAL AREA NETWORK FACSIMILE SENDING SYSTEM
REM CopyRight (c) 1990 by All The Fax, Inc.

REM $DYNAMIC
DEFINT A-Z

DECLARE SUB NetConfig ()
DECLARE SUB ReadConfig ()
DECLARE SUB NetVer ()
DECLARE SUB NetShutDown ()
DECLARE SUB NetRoute ()
DECLARE SUB NetNoRoute ()
DECLARE SUB NetSysPrint ()
DECLARE SUB NetSysErase ()
DECLARE SUB NetSent ()
DECLARE SUB NetPending ()
DECLARE SUB NetZapLog ()
DECLARE SUB NetLogPrint ()
DECLARE SUB NetView ()
DECLARE SUB NetLock ()
DECLARE FUNCTION FaxAdd2$ (fil$)

DIM SHARED Drive$
DIM SHARED NetName$
DIM SHARED FullName$
DIM SHARED RedialDelay$
DIM SHARED DeptCode$
DIM SHARED EmployeeID$
DIM SHARED NetworkID$
DIM SHARED AutoID$ ON ERROR GOTO ERRORHANDLER
A$ = COMMAND$
' A$ = "SALES.TXT TO 8290558+" + CHR$(34) + "PAUL" + CHR$(34) + " @08:02"

START:
REDIM FaxFiles$(100, 2)
REDIM FaxPhone$(100)
FaxCount = 0
PhoneCount = 0

CALL CRUNCH(A$, " ", SLEN)
A$ = LEFT$(A$, SLEN)
A$ = UCASE$(LTRIM$(RTRIM$(A$)))

TimeCheck = INSTR(1, A$, "@")
IF TimeCheck <> 0 THEN
    XLeftSide$ = LEFT$(A$, TimeCheck - 1)
    I = INSTR(TimeCheck + 1, A$, " ")
    IF I <> 0 THEN
```

```
      XRightSide$ = MID$(A$, I)
      ELSE
      XRightSide$ = ""
      I = LEN(A$)
      END IF
   J = 1 - TimeCheck
   XTime$ = LTRIM$(RTRIM$(MID$(A$, TimeCheck, J)))
   XHours = VAL(MID$(XTime$, 3, 2))
   XMin = VAL(MID$(XTime$, 6, 2))
   XTimer& = (XHours * 3600) + (XMin * 60)
   A$ = XLeftSide$ + " " + XRightSide$
   ELSE
   XTimer& = 0
   END IF
   CALL CRUNCH(A$, " ", SLEN)
   A$ = LEFT$(A$, SLEN)
   A$ = UCASE$(LTRIM$(RTRIM$(A$)))

JobLoc = INSTR(1, A$, "##")
   IF JobLoc <> 0 THEN
      JobID$ = LTRIM$(RTRIM$(MID$(A$, JobLoc + 2)))
      A$ = LTRIM$(RTRIM$(LEFT$(A$, JobLoc - 1)))
      END IF
   Y = INSTR(1, A$, " TO ")

IF A$ = "CONFIG" THEN CALL NetConfig
   NetName$ = ENVIRON$("NFNAM")
   Drive$ = ENVIRON$("NFDRV")

found = 0
   CALL Exist(Drive$ + "\NETFAX\" + LEFT$(NetName$, 8) + ".CFG", found)

IF found THEN
      CALL ReadConfig
      ELSE
      CLS
      PRINT " ERROR - Netfax Configuration File Not Found."
      PRINT
      PRINT "Please Type 'NETFAX CONFIG' To Create"
      PRINT "A Netfax Configuration File For This User."
      PRINT
      END
      END IF SELECT CASE A$
CASE "VER"
   CALL NetVer
CASE "SHUTDOWN"
   CALL NetShutDown
CASE "ROUTE"
   CALL NetRoute
CASE "NOROUTE"
   CALL NetNoRoute
CASE "SYSPRINT"
   CALL NetSysPrint
CASE "SYSERASE"
   CALL NetSysErase
CASE "SENT"
   CALL NetSent
CASE "PENDING"
   CALL NetPending
```

```
CASE "ZAPLOG"
    CALL NetZapLog
CASE "LOGPRINT"
    CALL NetLogPrint
CASE "VIEW", "RECEIVE"
    CALL NetView
CASE ELSE
END SELECT IF AS = "" OR Y = 0 THEN
    CLS
    PRINT " ERROR On NETFAX Command Line."
    PRINT
    PRINT " NETFAX " + AS
    PRINT
    END
    END IF ParseLoc = 1
DO
    X = INSTR(ParseLoc, AS, " ")
    IF X >= ParseLoc THEN
        Param$ = MID$(AS, ParseLoc, X - ParseLoc)
        ELSE
        Param$ = MID$(AS, ParseLoc)
        END IF
    IF INSTR(1, Param$, CHR$(34)) <> 0 THEN
        QuoteLoc1 = INSTR(ParseLoc, AS, CHR$(34))
        QuoteLoc2 = INSTR(QuoteLoc1 + 1, AS, CHR$(34))
        IF QuoteLoc2 = 0 THEN
            PRINT
            PRINT " ERROR - The Quotes In Your Attention String Do Not Match!"
            PRINT " Message VOIDED."
            CLOSE
            END
            END IF
        X = INSTR(QuoteLoc2 + 1, AS, " ")
        IF X >= ParseLoc THEN
            Param$ = MID$(AS, ParseLoc, X - ParseLoc)
            ELSE
            Param$ = MID$(AS, ParseLoc)
            END IF
        END IF
    IF ParseLoc < Y + 4 THEN
        FaxCount = FaxCount + 1
        FileType$ = RIGHT$(Param$, 4)
        SELECT CASE FileType$
        CASE ".TIF"
        CASE ".TXT"
        CASE ".PCX"
        CASE ".PS"
        CASE ".LST", ".GRP", ".PHN"
            LeftSide$ = LEFT$(AS, ParseLoc - 1)
            RightSide$ = MID$(AS, X)
            ES = " "
            found = 0
            CALL Exist(Param$, found)
            IF found THEN
                OPEN Param$ FOR INPUT AS #3
                DO
                    LINE INPUT #3, F$
                    ES = ES + F$ + " "
```

```
            LOOP UNTIL EOF(3)
         CLOSE #3
         AS = LeftSideS + ES + RightSideS
         GOTO START
         ELSE
         PRINT " ERROR - Fax Document Group File "; ParamS; " Not Found."
         PRINT " Message VOIDED."
         END
         END IF
   CASE ELSE
   END SELECT FaxFilesS(FaxCount, 1) = LTRIMS(RTRIMS(ParamS))
   found = 0
   CALL Exist(ParamS, found)
   IF (NOT found) AND (FaxFilesS(FaxCount, 1) <> "TO") THEN
      BEEP
      PRINT
      PRINT " ERROR - Fax Message File "; ParamS; " Not Found."
      PRINT " Message VOIDED."
      FaxCount = FaxCount - 1
      END
      END IF
        IF FaxFilesS(FaxCount, 1) = "TO" THEN
           FaxCount = FaxCount - 1
           END IF
        END IF
     IF ParseLoc >= Y + 4 THEN
        PhoneCount = PhoneCount + 1
        FileTypeS = RIGHTS(ParamS, 4)
        SELECT CASE FileTypeS
        CASE ".LST", ".GRP", ".PHN"
           LeftSideS = LEFTS(AS, ParseLoc - 1)
           IF X <> 0 THEN RightSideS = MIDS(AS, X) ELSE RightSideS = ""
           ES = " "
           found = 0
           CALL Exist(ParamS, found)
           IF found THEN
              OPEN ParamS FOR INPUT AS #3
              DO
                 LINE INPUT #3, FS
                 ES = ES + FS + " "
                 LOOP UNTIL EOF(3)
              CLOSE #3
              AS = LeftSideS + ES + RightSideS
              GOTO START
              ELSE
              PRINT " ERROR - Fax Document Group File "; ParamS; " Not Found."
              PRINT " Message VOIDED."
              END
              END IF
        CASE ELSE
        END SELECT
        FaxPhoneS(PhoneCount) = LTRIMS(RTRIMS(ParamS))
        END IF
      ParseLoc = X + 1
    LOOP UNTIL X = 0

IF FaxCount = 0 THEN
    PRINT
    PRINT " ERROR - No Valid Facsimile Or Text Files Specified."
    PRINT
```

```
        END
      END IF

IF PhoneCount = 0 THEN
      PRINT
      PRINT " ERROR - No Valid Phone Numbers Specified."
      PRINT
      END
   END IF FOR I = 1 TO FaxCount
      CALL NetLock
      FromFile$ = FaxFiles$(I, 1)
      REM Get the next file name to be used off of the file server
      OPEN Drive$ + "\FAXSEND\NETFAX.SND" FOR INPUT AS #2
      INPUT #2, FileNumber$
      IF FileNumber$ >= "8999" THEN FileNumber$ = "0001"
      CLOSE #2
      NextFile$ = FaxAdd2$(FileNumber$)
      OPEN Drive$ + "\FAXSEND\NETFAX.SND" FOR OUTPUT AS #2
      WRITE #2, NextFile$
      CLOSE #2
      CALL CopyFile(Drive$ + "\FAXSEND\NETFAX.ZZZ", Drive$ + "\FAXSEND\NETFAX.TMP", ECode)
      ToFile$ = FileNumber$ + "P001"
      IF INSTR(1, FromFile$, ".TIF") <> 0 THEN ToFile$ = ToFile$ + ".TIF"
      IF INSTR(1, FromFile$, "..TXT") <> 0 THEN ToFile$ = ToFile$ + "..XT"
      IF INSTR(1, FromFile$, ".PCX") <> 0 THEN ToFile$ = ToFile$ + ".PCX"
      IF INSTR(1, FromFile$, ".PS") <> 0 THEN ToFile$ = ToFile$ + ".PS"
      FaxFiles$(I, 2) = ToFile$
   NEXT I CALL NetLock
   MifFile$ = LEFT$(ToFile$, 4) + "P001.MIF"
   OPEN MifFile$ FOR OUTPUT AS #1
   YTimer$ = LTRIM$(RTRIM$(STR$(XTimer&)))

PRINT #1, "FROM: "; NetName$; " / "; FullName$
   PRINT #1, "TIMER: "; YTimer$
   PRINT #1, "DEPT: "; DeptCode$
   PRINT #1, "EMPL: "; EmployeeID$
   PRINT #1, "JOB: "; JobID$
   PRINT #1, "RETRY: 0"
   FOR I = 1 TO FaxCount
      PRINT #1, "FILE: "; FaxFiles$(I, 2); CHR$(44); FaxFiles$(I, 1)
   NEXT I
   FOR I = 1 TO PhoneCount
      PRINT #1, "PHONE: "; FaxPhone$(I)
   NEXT I
   CLOSE #1
   CALL CopyFile(MifFile$, Drive$ + "\FAXSEND\" + MifFile$, ECode)
   FOR I = 1 TO FaxCount
      FromFile$ = FaxFiles$(I, 1)
      ToFile$ = FaxFiles$(I, 2)
      DO
         CALL CopyFile(FromFile$, Drive$ + "\FAXSEND\" + ToFile$, ECode)
         XFromFile$ = FromFile$
         XToFile$ = ToFile$
         NextFrom$ = FaxAdd2$(XFromFile$)
         NextTo$ = FaxAdd2$(XToFile$)
         found = 0
         CALL Exist(NextFrom$, found)
         IF found THEN
```

```
            FromFile$ = NextFrom$
            ToFile$ = NextTo$
            END IF
        LOOP UNTIL NOT found
    NEXT I CALL CopyFile(Drive$ + "\FAXSEND\NETFAX.ZZZ", Drive$ + "\FAXSEND\NETFAX.TMP", ECode)
    PRINT "  NETFAX - CopyRight (c) 1990 by ALL THE FAX"
    PRINT "            All Rights Reserved"
    PRINT " "
    PRINT "  Message Queued..."
    CALL DelFile(MifFile$, ECode)
    END ERRORHANDLER:
ErrorCode = ERR
ErrorLine = ERL
PRINT " An Unknown ERROR Has Occurred...."
PRINT " Error Number:  "; ErrorCode
PRINT " Line NUmber:   "; ErrorLine
PRINT
PRINT " Message VOIDED."
CLOSE
END DEFINT A-Z
FUNCTION FaxAdd2$ (fil$)
FileName$ = LTRIM$(RTRIM$(UCASE$(fil$)))
IF INSTR(1, FileName$, ".") <> 0 THEN
    Extension$ = MID$(FileName$, INSTR(1, FileName$, "."), 4)
    FileName$ = LEFT$(FileName$, INSTR(1, FileName$, ".") - 1)
ELSE
    Extension$ = ""
END IF LastChar$ = RIGHT$(FileName$, 1)
StringLength = LEN(FileName$)

SELECT CASE LastChar$
CASE "A", "B", "C", "D", "E", "F", "G", "H", "I", "J", "K", "L", "M", "N", "O", "P", "Q", "R", "S", "T", "U", "V", "W", "X", "Y"
    CharCode = ASC(LastChar$)
    NewCode$ = CHR$(CharCode + 1)
    NewFileName$ = LEFT$(FileName$, StringLength - 1) + NewCode$ + Extension$
CASE "0", "1", "2", "3", "4", "5", "6", "7", "8"
    CharCode = ASC(LastChar$)
    NewCode$ = CHR$(CharCode + 1)
    NewFileName$ = LEFT$(FileName$, StringLength - 1) + NewCode$ + Extension$
CASE "Z"
    Temp$ = LEFT$(FileName$, StringLength - 1)
    NewFileName$ = FaxAdd2$(Temp$) + "A" + Extension$
CASE "9"
    Temp$ = LEFT$(FileName$, StringLength - 1)
    NewFileName$ = FaxAdd2$(Temp$) + "0" + Extension$
CASE ELSE
    NewFileName$ = FileName$ + Extension$
END SELECT
FaxAdd2$ = NewFileName$
END FUNCTION DEFINT A-Z
SUB NetConfig CLS
INPUT "Enter The Drive Letter For The Network Disk Drive (<RTN> = 'F'): ", Drive$
IF Drive$ = "" THEN Drive$ = "F:"
IF INSTR(1, Drive$, ":") = 0 THEN Drive$ = Drive$ + ":"
INPUT "Enter Your UNIQUE User Name (ID) For The Network: ", NetName$
IF NetName$ = "" THEN NetName$ = "SUPERVISOR"
INPUT "Enter Your Full Name: ", FullName$
IF FullName$ = "" THEN FullName$ = " "
RedialDelay$ = "1"
```

```
INPUT "Enter Your Department Code: ", DeptCode$
IF DeptCode$ = "" THEN DeptCode$ = " "
INPUT "Enter Your Employee ID Code: ", EmployeeID$
IF EmployeeID$ = "" THEN EmployeeID$ = NetName$
INPUT "Enter Network Type: ", NetworkType$
IF NetworkType$ = "" THEN NetworkType$ = "NOVELL"
INPUT "Enter Your Auto-Routing ID: ", AutoID$
IF AutoID$ = "" THEN AutoID$ = "0000"

NetName$ = UCASE$(NetName$)
Drive$ = UCASE$(Drive$)
FullName$ = UCASE$(FullName$)
RedialDelay$ = UCASE$(RedialDelay$)
DeptCode$ = UCASE$(DeptCode$)
EmployeeID$ = UCASE$(EmployeeID$)
NetworkType$ = UCASE$(NetworkType$)
AutoID$ = UCASE$(AutoID$)

OPEN Drive$ + "\NETFAX\" + LEFT$(NetName$, 8) + ".CFG" FOR OUTPUT AS #1
WRITE #1, Drive$
WRITE #1, NetName$
WRITE #1, FullName$
WRITE #1, RedialDelay$
WRITE #1, DeptCode$
WRITE #1, EmployeeID$
WRITE #1, NetworkType$
WRITE #1, AutoID$
CLOSE #1

OPEN Drive$ + "\NETFAX\" + LEFT$(AutoID$, 8) + ".TTI" FOR OUTPUT AS #1
WRITE #1, LEFT$(NetName$, 8)
CLOSE #1

PRINT
PRINT "Configuration Saved."
END
END SUB

DEFINT A-Z
SUB NetLock
StartTime& = INT(TIMER)
DO
    CALL DelFile(Drive$ + "\FAXSEND\NETFAX.TMP", ECode)
    IF ECode <> 0 THEN CALL Delay(1)
    IF INT(TIMER) > StartTime& + 20 THEN
        CALL CopyFile(Drive$ + "\FAXSEND\NETFAX.ZZZ", Drive$ + "\FAXSEND\NETFAX.TMP", ECode)
        END IF
    LOOP UNTIL ECode = 0
END SUB DEFINT A-Z
SUB NetLogPrint CALL NetLock
OPEN Drive$ + "\FAXSEND\" + LEFT$(NetName$, 8) + ".LOG" FOR INPUT AS #47
WHILE NOT EOF(47)
    LINE INPUT #47, W$
    LPRINT W$
    WEND
CLOSE #47
CALL CopyFile(Drive$ + "\FAXSEND\NETFAX.ZZZ", Drive$ + "\FAXSEND\NETFAX.TMP", ECode)
END

END SUB

DEFINT A-Z
SUB NetNoRoute
```

```
INPUT "Enter CSID NOT To Route From: ", CSID$
INPUT "Enter Your User ID: ", ID$
CSID$ = UCASE$(CSID$)
ID$ = UCASE$(ID$)
OPEN "NOROUTE.MIF" FOR OUTPUT AS #33
WRITE #33, CSID$, ID$
CLOSE #33
CALL CopyFile("NOROUTE.MIF", Drive$ + "\FAXSEND\NOROUTE.MIF", ECode)
CALL DelFile("NOROUTE.MIF", ECode)
PRINT "Routing Message Passed To Fax Server..."
END

END SUB

DEFINT A-Z
SUB NetPending

CALL NetLock
   OPEN "OUTBOUND.TMP" FOR OUTPUT AS #33
   Attr = 0
   files = Drive$ + "\FAXSEND\*.*"
   CALL FindFirstF(file$, Attr, ECode)
   WHILE ECode = 0
   fil$ = SPACE$(12)
   CALL GetNameF(fil$, flen)
   fil$ = LEFT$(fil$, flen)
   PRINT #33, fil$
   CALL FindNextF(ECode)
   WEND
   CLOSE #33
  OPEN "OUTBOUND.TMP" FOR INPUT AS #33
  OPEN "PENDLOG.FIL" FOR OUTPUT AS #35
  PRINT #35, "NETFAX PENDING LOG FOR "; FullName$
  PRINT #35, " "
  PRINT #35, "USER NAME    FILE NAME           PHONE NUMBER - ATTN:"
  PRINT #35, "-------------------------------------------------------------------------"
       L$ = "\       \ \              \ \                                            \"
   DO
      LINE INPUT #33, R$
      IF INSTR(1, R$, ".MIF") <> 0 THEN
      OPEN Drive$ + "\FAXSEND\" + R$ FOR INPUT AS #34
      DO
         LINE INPUT #34, RR$
         IF INSTR(1, RR$, " " + NetName$ + " ") <> 0 AND INSTR(1, RR$, "FROM") <> 0 THEN
            PNetName$ = RR$
            PUserName$ = NetName$
            DO
               LINE INPUT #34, RR$
               LOOP UNTIL INSTR(1, RR$, "FILE") <> 0
            XC = INSTR(1, RR$, ",")
            PFileName$ = MID$(RR$, XC + 1)
            DO
               LINE INPUT #34, RR$
               IF INSTR(1, RR$, "PHONE") <> 0 THEN
                  PPhone$ = MID$(RR$, 8)
                  PRINT #35, USING L$; PUserName$; PFileName$; PPhone$
                  END IF
               LOOP UNTIL EOF(34)
            END IF
      LOOP UNTIL EOF(34)
   CLOSE #34
   END IF
```

```
     LOOP UNTIL EOF(33)
CLOSE #35
CLOSE #33
CALL CopyFile(Drive$ + "\FAXSEND\NETFAX.ZZZ", Drive$ + "\FAXSEND\NETFAX.TMP", ECode)
SHELL "NFXSHOW PENDLOG.FIL"
CALL DelFile("PENDLOG.FIL", ECode)
CALL DelFile("OUTBOUND.TMP", ECode)
CLOSE
END

END SUB

DEFINT A-Z
SUB NetRoute

INPUT "Enter CSID To Route From: ", CSID$
INPUT "Enter User ID To Route To: ", ID$
CSID$ = UCASE$(CSID$)
ID$ = UCASE$(ID$)
OPEN "ROUTE.MIF" FOR OUTPUT AS #33
WRITE #33, CSID$, ID$
CLOSE #33
CALL CopyFile("ROUTE.MIF", Drive$ + "\FAXSEND\ROUTE.MIF", ECode)
CALL DelFile("ROUTE.MIF", ECode)
PRINT "Routing Message Passed To Fax Server..."
END
END SUB DEFINT A-Z
SUB NetSent CALL NetLock
CALL CopyFile(Drive$ + "\FAXSEND\" + LEFT$(NetName$, 8) + ".LOG", LEFT$(NetName$, 8) + ".LOG", ECode)
CALL CopyFile(Drive$ + "\FAXSEND\NETFAX.ZZZ", Drive$ + "\FAXSEND\NETFAX.TMP", ECode)
SHELL "NFXSHOW " + LEFT$(NetName$, 8) + ".LOG"
CALL DelFile(LEFT$(NetName$, 8) + ".LOG", ECode)
END

END SUB

DEFINT A-Z
SUB NetShutDown

OPEN "SHUTDOWN.MIF" FOR OUTPUT AS #33
PRINT #33, "SHUTDOWN"
CLOSE #33
CALL CopyFile("SHUTDOWN.MIF", Drive$ + "\FAXSEND\SHUTDOWN.MIF", ECode)
CALL DelFile("SHUTDOWN.MIF", ECode)
PRINT "NETFAX Server Being Shut Down..."
END

END SUB

DEFINT A-Z
SUB NetSysErase

OPEN "LOGERASE.MIF" FOR OUTPUT AS #33
PRINT #33, "LOGERASE"
CLOSE #33
CALL CopyFile("LOGERASE.MIF", Drive$ + "\FAXSEND\LOGERASE.MIF", ECode)
CALL DelFile("LOGERASE.MIF", ECode)
PRINT "NETFAX System Log Being Purged..."
```

```
END

END SUB

DEFINT A-Z
SUB NetSysPrint

OPEN "LOGPRINT.MIF" FOR OUTPUT AS #33
PRINT #33, "LOGPRINT"
CLOSE #33
CALL CopyFile("LOGPRINT.MIF", Drive$ + "\FAXSEND\LOGPRINT.MIF", ECode)
CALL DelFile("LOGPRINT.MIF", ECode)
'PRINT "NETFAX Log Being Printed..."
END

END SUB

DEFINT A-Z
SUB NetVer

PRINT
PRINT "NETFAX Version 2.0"
PRINT "Copyright (c) 1990 by All The Fax, Inc."
PRINT
END

END SUB

DEFINT A-Z
SUB NetView
REC'MESSAGES:
    OPEN "RECVLOG.TMP" FOR OUTPUT AS #33
    Attr = 0
    file$ = Drive$ + "\FAXRECV\*.TIF          "
    CALL FindFirstF(file$, Attr, ECode)
    WHILE ECode = 0
        fil$ = SPACE$(12)
        CALL GetNameF(fil$, flen)
        fil$ = LEFT$(fil$, flen)
        PRINT #33, fil$
        CALL FindNextF(ECode)
    WEND
    CLOSE #33
    OPEN "RECVLOG.TMP" FOR INPUT AS #33
    REDIM FAXD$(100, 3)
    F = 0
    DO
        LINE INPUT #33, XFAX$
        IF INSTR(1, XFAX$, ".TIF") <> 0 AND F < 100 THEN
            XTemp$ = LEFT$(XFAX$, 4) + ".MIF"
            OPEN Drive$ + "\FAXRECV\" + XTemp$ FOR INPUT AS #34
            LINE INPUT #34, RCSID$
            DO
                LINE INPUT #34, XUser$
                LOOP UNTIL EOF(34) OR INSTR(1, XUser$, LEFT$(NetName$, 8)) <> 0
            CLOSE #34
            IF INSTR(1, XUser$, LEFT$(NetName$, 8)) <> 0 THEN
                F = F + 1
                FAXD$(F, 1) = XFAX$
                FAXD$(F, 2) = RCSID$
                FAXD$(F, 3) = LEFT$(NetName$, 8)
            END IF
```

```
      END IF
   LOOP UNTIL EOF(33)
CLOSE #33
CLS
PRINT "Select Received Message"
PRINT
   LL$ = " ###    \             \ Received From: \             \ For: \        \"
FOR I = 1 TO F
   PRINT USING LL$; I; FAXD$(I, 1); FAXD$(I, 2); FAXD$(I, 3)
   IF CSRLIN = 23 OR I = F THEN
      LOCATE 25, 1, 1
      INPUT "Select Message Number Or Press RETURN For More (-999 = Quit): ", X
      IF X = -999 THEN
         CLS
         PRINT "Exiting..."
         END
      END IF
      IF X = 0 THEN
         CLS
         PRINT "Select Received Message"
         PRINT
      END IF
      IF X <> 0 THEN
         FileName$ = FAXD$(X, 1)
         SHELL "FAXD -i1 -r0 " + Drive$ + "\FAXRECV\" + FileName$ + " > NUL"
         CLS
         PRINT "What Would You Like To Do With This Message: "
         PRINT
         PRINT " 1 - Print This Message"
         PRINT " 2 - Notify Another User About This Message"
         PRINT " 3 - Purge This Message"
         PRINT " 4 - Copy This Message To My Current Directory"
         PRINT " 5 - Check Another Received Message"
         PRINT " 6 - Resend This Message"
         PRINT " 7 - Exit Netfax"
         PRINT
         INPUT " Enter Selection (RETURN = 7): ", Answer$
         SELECT CASE Answer$
         CASE "1"
            PRINT
            INPUT " Enter Printer Number: ", XPrint$
            XPrint$ = LTRIM$(RTRIM$(XPrint$))
            PRINT " Printing...  Please Wait."
            SHELL "FAXP -g1 -i20 -m" + XPrint$ + " " + Drive$ + "\FAXRECV\" + FileName$ + " > NUL"
         CASE "2"
            PRINT
            INPUT " Enter User ID To Send To: ", XID$
            XTemp$ = LEFT$(FileName$, 4) + ".MIF"
            OPEN Drive$ + "\FAXRECV\" + XTemp$ FOR INPUT AS #54
            OPEN Drive$ + "\FAXRECV\TEMP.$$$" FOR OUTPUT AS #55
            LINE INPUT #54, RCSID$
            PRINT #55, RCSID$
            PRINT #55, LEFT$(XID$, 8)
            DO
               LINE INPUT #54, XUser$
               PRINT #55, XUser$
            LOOP UNTIL EOF(54)
            CLOSE #54
            CLOSE #55
            CALL DelFile(Drive$ + "\FAXRECV\" + XTemp$, ECode)
            NAME Drive$ + "\FAXRECV\TEMP.$$$" AS Drive$ + "\FAXRECV\" + XTemp$
            SHELL "SEND " + CHR$(34) + "PLEASE CHECK RECEIVED FAX MSG " + FileName$ + CHR$(34) + " TO " + XID$ + " > NUL"
         CASE "3"
            PRINT
            INPUT " Are You Sure (Y/N): ", AY$
            AY$ = UCASE$(AY$)
            IF AY$ = "Y" THEN
               Attr = 0
               CALL DelFile(Drive$ + "\FAXRECV\" + LEFT$(FileName$, 4) + ".MIF", ECode)
               file$ = Drive$ + "\FAXRECV\" + LEFT$(FileName$, 5) + "*.*"
               CALL FindFirstF(file$, Attr, ECode)
               WHILE ECode = 0
```

```
            fil$ = SPACES(12)
            CALL GetNameF(fil$, flen)
            fil$ = LEFT$(fil$, flen)
            CALL DelFile(Drive$ + "\FAXRECV\" + fil$, ECode)
            CALL FindNextF(ECode)
            WEND
        END IF
    CASE "4"
        PRINT
        INPUT " Enter Drive & Directory To Save To: ", DD$
        Attr = 0
        file$ = Drive$ + "\FAXRECV\" + LEFT$(FileName$, 5) + "*.*"
        CALL FindFirstF(file$, Attr, ECode)
        WHILE ECode = 0
            fil$ = SPACES(12)
            CALL GetNameF(fil$, flen)
            fil$ = LEFT$(fil$, flen)
            CALL CopyFile(Drive$ + "\FAXRECV\" + fil$, fil$, ECode)
            CALL FindNextF(ECode)
        WEND
    CASE "5"
    CASE "6"
    CASE "7"
    CASE ELSE
        Answer$ = "7"
    END SELECT
    END IF END IF
        NEXT I
        IF F = 0 THEN
            PRINT "No Received Messages In Queue."
            PRINT
        END IF
    IF Answer$ = "7" OR F = 0 THEN END
    GOTO RECVMESSAGES

END SUB

DEFINT A-Z
SUB NetZapLog

CALL NetLock
    CALL DelFile(Drive$ + "\FAXSEND\" + LEFT$(NetName$, 8) + ".LOG", ECode)
    CALL DelFile(LEFT$(NetName$, 8) + ".LOG", ECode)
    CALL CopyFile(Drive$ + "\FAXSEND\NETFAX.ZZZ", Drive$ + "\FAXSEND\NETFAX.TMP", ECode)
    PRINT "NETFAX Local User Log Being Purged..."
    END

END SUB

DEFINT A-Z
SUB ReadConfig
    OPEN Drive$ + "\NETFAX\" + LEFT$(NetName$, 8) + ".CFG" FOR INPUT AS #1
    INPUT #1, Drive$
    INPUT #1, NetName$
    INPUT #1, FullName$
    INPUT #1, RedialDelay$
    INPUT #1, DeptCode$
    INPUT #1, EmployeeID$
    INPUT #1, NetworkType$
    INPUT #1, AutoID$
    CLOSE #1
END SUB
```

What is claimed is:

1. A method for directing a facsimile communication including handshake data fields transmitted from a facsimile transmitting apparatus at a first location to an intended recipient at a second location, the intended recipient being one of a plurality of users of a local area network having a facsimile receiving apparatus coupled thereto, comprising:

assigning each user an identification number identifying his location on said network;

modifying in a non-destructive manner a field of said data fields transmitted during the handshake protocols between said transmitting and receiving apparatus to accept one of said identification numbers;

inserting the identification number of the intended recipient into said modified field;

establishing facsimile communication between said transmitting and receiving apparatus;

transmitting the facsimile communication to the receiving apparatus, wherein said transmission includes said modified field as part of the handshake data fields and generating an image of said received facsimile communication at the receiving apparatus;

identifying the received modified field at said second location and extracting the identification number therefrom; and forwarding the facsimile image to the location identified by said identification number.

2. The method of claim 1, wherein said modified field is a TSI field of the facsimile transmitting apparatus.

3. The method of claim 2, wherein said modification step comprises the step of defining a sub-field of a defined length within said field of the data fields for acceptance of said identification number, said sub-field having a control character at the start position thereof.

4. The method of claim 3, wherein said control character is chosen from the group consisting of * and # symbols.

5. The method of claim 1, wherein said insertion step includes the steps of storing the identification number as part of the recipient's facsimile system telephone number and retrieving the identification number from storage for insertion into said modified field.

6. The method of claim 5, wherein said retrieving step includes the steps of retrieving the recipient's telephone number from storage and locating the portion thereof representing the identification number.

7. The method of claim 6, wherein the identification number is stored as a suffix to the recipient's telephone number.

8. The method of claim 7, wherein the identification number is stored with a preceding control character.

9. The method of claim 8, wherein said control character is chosen from the group consisting of * and # symbols.

10. A method for the automated selective processing of a facsimile communication having handshake data fields transmitted in connection therewith upon receipt by a facsimile-reception enabled receiving facility comprising assigning an identification number to each of a plurality of processing routines;

modifying a field of the handshake data fields in a non-destructive manner to include a field adapted to accept one of said identification numbers;

inserting the identification number corresponding to a chosen routine into said modified field;

transmitting the facsimile communication to the receiving facility, including transmission of said modified field as part of the handshake data fields;

identifying the modified field at the receiving facility and extracting the identification number therefrom; and performing the processing routine associated with the identification number by the receiving facility.

* * * * *